(12) United States Patent
Jodeleit

(10) Patent No.: US 11,933,348 B2
(45) Date of Patent: Mar. 19, 2024

(54) CONNECTION BETWEEN TWO COMPONENTS WITH TOLERANCE COMPENSATION AND A CONNECTING METHOD THEREFOR

(71) Applicant: Böllhoff Verbindungstechnik GmbH, Bielefeld (DE)

(72) Inventor: Martin Jodeleit, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 569 days.

(21) Appl. No.: 17/053,217

(22) PCT Filed: May 7, 2019

(86) PCT No.: PCT/EP2019/061730
§ 371 (c)(1),
(2) Date: Nov. 5, 2020

(87) PCT Pub. No.: WO2019/215186
PCT Pub. Date: Nov. 14, 2019

(65) Prior Publication Data
US 2021/0231144 A1    Jul. 29, 2021

(30) Foreign Application Priority Data

May 8, 2018   (DE) .................... DE102018111049.9

(51) Int. Cl.
*F16B 5/04*     (2006.01)
*F16B 5/02*     (2006.01)
(Continued)

(52) U.S. Cl.
CPC ............ *F16B 5/04* (2013.01); *F16B 19/1054* (2013.01); *F16B 5/0233* (2013.01); *F16B 19/008* (2013.01); *F16B 19/1072* (2013.01)

(58) Field of Classification Search
CPC ...... F16B 5/04; F16B 19/1054; F16B 5/0233; F16B 19/008; F16B 19/1072; F16B 5/025;
(Continued)

(56) References Cited

U.S. PATENT DOCUMENTS 3,300,798 A  * 1/1967 York .................... F16B 19/008
                                                29/523
4,074,608 A    2/1978 Siebol
(Continued)

FOREIGN PATENT DOCUMENTS

CN      201129348 Y    10/2008
CN      210440347 U    5/2020
(Continued)

OTHER PUBLICATIONS

Written Opinion & International Search Report for PCT/EP2019/061730 dated Jul. 23, 2019, 14 pages.

*Primary Examiner* — Victor D Batson
*Assistant Examiner* — Jock Wong
(74) *Attorney, Agent, or Firm* — Reising Ethington P.C.

(57) ABSTRACT

A connection between at least a first component A and a second component B with an attachment arrangement with tolerance compensation between the first component A and the second component B. The entire connection is fixated via a blind rivet which is not non-destructively detachable while a compensating sleeve spans a distance between the first component A and the second component B.

24 Claims, 9 Drawing Sheets

Figure 1:
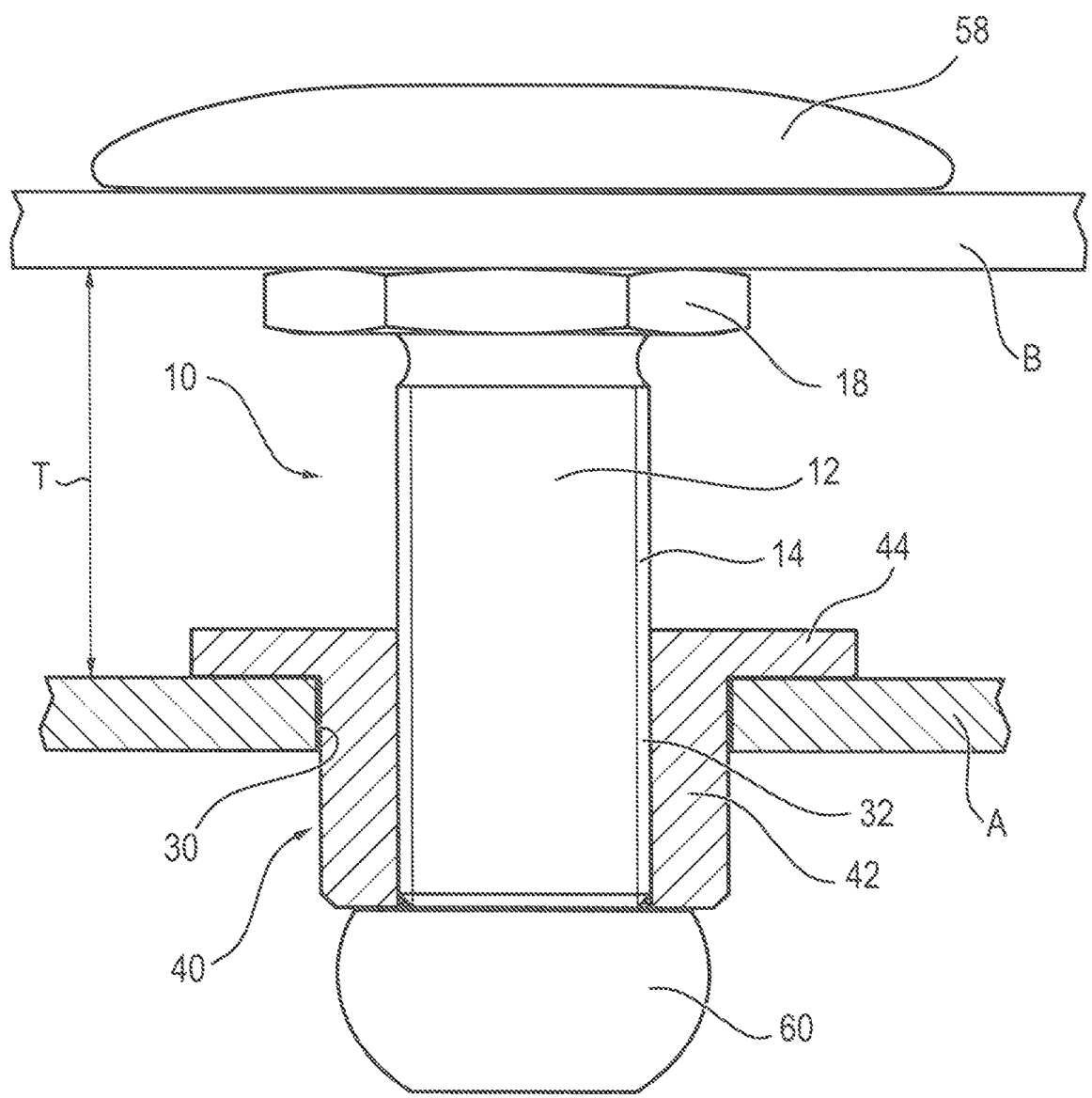

(51) Int. Cl.
*F16B 19/10* (2006.01)
*F16B 19/00* (2006.01)

(58) Field of Classification Search
CPC .......... F16B 19/04; F16B 19/08; F16B 19/10; F16B 19/1027; F16B 19/1036; F16B 19/1045; F16B 5/0283
USPC .............................................. 411/43, 546, 41
See application file for complete search history.

(56) References Cited

U.S. PATENT DOCUMENTS

| | | | | |
|---|---|---|---|---|
| 4,949,450 A * | 8/1990 | Scharres | ................ | B21J 15/043 29/523 |
| 5,197,840 A | 3/1993 | Peek | | |
| 5,340,258 A * | 8/1994 | Simon | ................... | F16B 35/005 411/339 |
| 5,397,205 A * | 3/1995 | Diepeveen | ............... | B21J 15/02 29/523 |
| 6,357,953 B1 * | 3/2002 | Ballantyne | ............ | F16B 5/0233 403/372 |
| 6,688,830 B2 * | 2/2004 | Kluting | ................ | F16B 5/0233 411/125 |
| 6,796,765 B2 * | 9/2004 | Kosel | ....................... | F02C 7/00 29/523 |
| 6,860,686 B2 * | 3/2005 | Schneider | ............. | F16B 35/048 411/546 |
| 7,396,287 B2 | 7/2008 | Jennings et al. | | |
| 7,488,135 B2 * | 2/2009 | Hasegawa | ............ | F16B 5/0233 403/22 |
| 7,887,273 B2 * | 2/2011 | Vigliotti | .............. | F16B 19/1045 411/43 |
| 8,066,465 B2 | 11/2011 | Figge et al. | | |
| 8,944,736 B2 * | 2/2015 | Figge | ...................... | F16B 35/00 224/322 |
| 9,771,962 B2 | 9/2017 | Metten et al. | | |
| 10,145,399 B2 | 12/2018 | Haselberger et al. | | |
| 10,639,978 B2 | 5/2020 | Yoshida | | |
| 2002/0154966 A1 * | 10/2002 | Stone | ........................ | F16B 5/025 411/352 |
| 2003/0068210 A1 * | 4/2003 | Pountney | ............ | G09F 15/0006 411/384 |
| 2003/0077118 A1 * | 4/2003 | Kobusch | ................ | F16B 5/0283 403/408.1 |
| 2005/0047893 A1 * | 3/2005 | Schwarzbich | ........ | F16B 5/0233 411/546 |
| 2005/0050818 A1 * | 3/2005 | Chen | ..................... | F16B 5/0233 52/263 |
| 2007/0207012 A1 * | 9/2007 | Lorenzo | ................ | F16B 5/0233 411/546 |
| 2009/0067920 A1 * | 3/2009 | Jodeleit | ............... | F16B 19/1072 403/376 |
| 2011/0069462 A1 * | 3/2011 | Lewis | ....................... | F16B 5/04 361/759 |
| 2012/0128446 A1 * | 5/2012 | Baumbach | ............ | F16B 5/0233 411/387.1 |
| 2015/0240854 A1 * | 8/2015 | Scholefield | ......... | F16B 5/0275 411/43 |
| 2015/0291225 A1 | 10/2015 | Yao et al. | | |
| 2017/0276165 A1 * | 9/2017 | Matsunami | ............ | B25B 13/48 |

FOREIGN PATENT DOCUMENTS

| | | | | |
|---|---|---|---|---|
| DE | 1400835 A1 | 10/1969 | | |
| DE | 2651780 A1 | 5/1977 | | |
| DE | 19839710 A1 | 3/2000 | | |
| DE | 19910511 A1 * | 9/2000 | ........... | F16B 5/0233 |
| DE | 19933674 A1 | 1/2001 | | |
| DE | 10063649 A1 * | 7/2002 | ........... | B62D 25/147 |
| DE | 10104949 A1 * | 9/2002 | ........... | F16B 37/044 |
| DE | 60113051 T2 | 4/2006 | | |
| DE | 202006012493 U1 | 11/2006 | | |
| DE | 102007037242 A1 | 2/2008 | | |
| DE | 102009035785 A1 | 3/2010 | | |
| DE | 202011105943 U1 | 10/2011 | | |
| DE | 102010048239 A1 * | 4/2012 | .............. | F16B 5/025 |
| DE | 202011103827 U1 | 5/2012 | | |
| DE | 102011087313 A1 | 5/2013 | | |
| DE | 102011056465 A1 * | 6/2013 | .............. | F16B 31/02 |
| DE | 102012102906 A1 | 10/2013 | | |
| DE | 102014100697 A1 | 7/2015 | | |
| DE | 102014014474 A1 | 3/2016 | | |
| EP | 2075475 A1 * | 7/2009 | .............. | F16B 5/025 |
| JP | 2017165361 A | 9/2017 | | |
| WO | WO-2009132755 A1 * | 11/2009 | ........... | B60Q 1/0441 |
| WO | WO2011015304 A1 | 2/2011 | | |
| WO | WO2015131218 A1 | 9/2015 | | |

\* cited by examiner

CONNECTION BETWEEN TWO COMPONENTS WITH TOLERANCE COMPENSATION AND A CONNECTING METHOD THEREFOR

1. TECHNICAL FIELD

The present disclosure concerns a connection between at least a first component and a second component by means of an attachment arrangement with tolerance compensation between the first component and the second component. The present disclosure furthermore concerns a connection method for connecting a first component and a second component by means of the attachment arrangement with tolerance compensation.

2. BACKGROUND

Attachment arrangements with automated tolerance compensation are known in prior art. Such attachment arrangements are found, for example, in the following patent applications: DE 10 2014 100 697 A1, DE 10 2007 037 242 A1, WO 2015/131218 A1 and DE 10 2012 102 906 A1.

These attachment arrangements with automated tolerance compensation have as key components a base unit which is fixed to the first component in most cases. An adjustment unit is rotatably attached to the base unit via a thread. As soon as a screw or bolt is screwed into the attachment arrangement as a fastening element, here the sleeve-like base unit and the sleeve-like adjustment unit, a dragging element of the adjustment unit ensures concurrent turning of the adjustment unit with the fastening bolt to be screwed in. This concurrent turning ensures that a distance between the first component and a second component arranged opposite one another is compensated automatically until the adjustment unit rests against the second component. Then afterward the connection of the two components is tightened via the attachment arrangement arranged between by means of the screwed-in bolt and a female thread element. This female thread element is, for example, comprised by a nut, as described in WO 2015/131218 A1.

In the other documents for prior art cited above, such as DE 10 2012 102 906 A1, the base element is constituted by a blind rivet nut. This blind rivet nut is fixated in an opening of the first component. Thus, this fixed arrangement provides a female thread into which the fastening bolt is screwed after automated tolerance compensation has taken place between the two components to be attached to one another.

These automated tolerance compensation systems are characterized in that the fastening bolt to be screwed in causes the adjustment unit to turn concurrently via the rotation of the bolt and a suitably arranged dragging element. Since the adjustment unit has a thread, the thread direction of which is opposite to that of the thread for the fastening bolt, when the fastening bolt is screwed into the base unit the adjustment unit is screwed out of this base unit. Tolerances existing between the oppositely arranged components are compensated automatically in this manner.

Despite this advantageous automated functionality for known tolerance compensation systems, the fastening bolts used here can loosen due to mechanical stresses in the component connection. Such mechanical stresses are, for example, vibrations in at least one of the components connected to one another.

Although it appears advantageous at first that the known automated tolerance compensation systems can be detached again due to the use of the fastening bolt, in fact disadvantages result from this approach. This is because, on account of the mechanical stresses of the components connected to one another, a loosening of an existing connection frequently leads to these two components no longer being able to be connected to one another with a precise fit. Correspondingly, the new connection produced has tolerances which result in reduced strength of the newly made connection and/or an inferior aesthetic appearance of the two components connected to one another.

Therefore it is the object of at least some implementations of the present invention to provide an alternative connection between at least a first component and a second component by means of an attachment arrangement with tolerance compensation which, compared to prior art, is less subject to mechanical stresses and thus more reliable in the connection produced.

3. SUMMARY

The object above is solved by a connection between at least a first component and a second component with an attachment arrangement with, in particular, non-automated tolerance compensation between the first component and the second component as well as by an attachment arrangement. Furthermore, the object above is solved by a connection method for at least a first component and a second component by means of an attachment arrangement with, in particular, non-automated tolerance compensation between the first component and the second component. Further embodiments and developments are derived from the description below, the accompanying drawings and the appendant claims.

The connection is produced by means of an attachment arrangement with tolerance compensation between at least a first component A and a second component B. This attachment arrangement is characterized by the following features: a compensating sleeve which comprises an inner through connection tube or passage channel, which is in particular without threading, and an outer thread on a radial outer side, in which the outer thread is formed to fit a mating thread of a hole of the first component A, in which the compensating sleeve is arranged in an axially adjustable manner for tolerance compensation between the first component A and the second component B by turning, the compensating sleeve has on its end side, facing away from component A, a supporting end face, may be a radial support collar against which the second component B rests, where a blind rivet which is not nondestructively detachable or releasable is attached in the through connection tube so that the second component B is fixated between the support collar and a set head of the blind rivet.

The first component A and the second component B are securely attached to one another by means of the attachment arrangement described above. Here the compensating sleeve ensures that the two components A, B are mutually braced against one another in the connection. Non-detachable integrity of the connection between at least the first component A and the second component B is guaranteed by the blind rivet. For this purpose, the set head of the blind rivet is braced against component B opposite to the supporting end face of the compensating sleeve on the one hand, while at the same time the compensating sleeve has an axially stable connection to the first component A via the thread connection of said sleeve. The two components A, B are fixated against each another via the compensating sleeve due to the use of the blind rivet. Since the positive, frictionally engaged connection by the blind rivet between the set head and a closing head to be formed is not nondestructively detachable, the connection produced here between the components A, B is also less subject to mechanical stresses, such as vibrations, compared to threaded connections. A further advantage results from the space-saving design of a blind rivet compared to threaded connections consisting of a threaded bolt and nut or a blind rivet nut. The set head and the closing head are constituted in a manner which uses less space than, for example, a bolt or screw head and a nut.

According to a further embodiment, the blind rivet has a sleeve-like rivet shaft with a set head arranged on the end side which can be accommodated in the through connection tube of the compensating sleeve. According to a further embodiment, a rivet mandrel is arranged in the sleeve-like rivet shaft, said mandrel having a rivet mandrel head on an end of the rivet shaft facing away from the set head.

In accordance with known design concepts for blind rivets, the blind rivet used also has a sleeve-like rivet shaft. When the connection is produced, this sleeve-like rivet shaft is widened by the rivet mandrel head forced axially into the rivet shaft in order to form a closing head. In coordination with the compensating sleeve, the sleeve-like rivet shaft may be dimensioned in such a way that it fits into the through connecting tube of the compensating sleeve as precisely as possible or with low radial tolerances. In this way adverse effects on the present connection by mechanical stresses in the radial direction of the compensating sleeve and/or of the sleeve-like rivet shaft from possible tolerances between the outer diameter of the sleeve-like rivet shaft and the inside or inner diameter of the compensating sleeve may be avoided.

According to a further embodiment of the connection, a length of the rivet shaft is adapted to a length of the compensating sleeve such that in a fixated condition of the two components A, B a closing head of the blind rivet is arranged adjacent to an end of the compensating sleeve facing away from the support collar. Accordingly, the closing head may be arranged outside of the through connection tube in the connection produced.

The embodiment of the rivet shaft described above ensures that an expandable area of the rivet shaft may be arranged outside of the compensating sleeve. Due to this arrangement, the rivet mandrel head which is then drawn into the rivet shaft in an axial direction is able to widen the rivet shaft in a radial direction in order to form the rivet head outside of the through connection tube of the compensating sleeve.

As an alternative to this attachment arrangement, it may be preferred to implement the formation of the closing head inside the through connection tube by radial widening of the rivet shaft by the rivet mandrel head. In this manner, a frictional connection of the closing head is produced inside the through connection tube, which attaches the two components A, B to one another. Both alternatives of the connection described above fix the distance determined by the compensating sleeve between the components A, B. This distance and this connection is only detachable or releasable by destruction of the blind rivet. Thus, mechanical stresses of the connection produced do not lead to adverse effects on the arrangement and precision nor on the strength of the connection between the components A, B.

According to a further embodiment of the connection, a radial outer side of the rivet shaft is adapted to a radial inner side of the through connection tube of the compensating sleeve in such a way that the radial outer side of the rivet shaft and the radial inner side of the through connection tube form a frictional and/or positive connection with one another.

These further embodiments of the connection and in particular of the attachment arrangement used in this connection make it possible that, by means of the blind rivet set into the compensating sleeve, this compensating sleeve can be set to a distance between the two components A, B. For this it is to be emphasized that the compensating sleeve is arranged in an axially adjustable manner by turning in the hole of the first component A via the thread connection already mentioned above. As soon as the rivet shaft of the blind rivet has been inserted into the through connecting tube of the compensating sleeve, the frictional connection and/or the positive connection ensure that the compensating sleeve is turned concurrently with the turning of the rivet shaft. It is correspondingly possible by turning the rivet shaft to set the compensating sleeve in its axial position via the thread connection with the first component A in a way fitting to the spacing with respect to the second component B. For this purpose, the rivet shaft may be turned until the supporting end face or the radial support collar of the compensating sleeve rests against the second component B.

According to a further embodiment, the rivet shaft has a polygonal outer profile which engages positively in the polygonal inner profile of the through connection tube. According to different embodiments, such a polygonal outer profile and a polygonal inner profile which is formed in a manner complementary to the former profile is formed by a three-sided, four-sided, six-sided or another corresponding profile. Since the polygonal profiles are not made rotationally symmetric in their cross-section, a positive connection between a polygonal outer profile of the rivet shaft and a polygonal inner profile of the through connection tube arises when turning on the longitudinal axes of the rivet shaft and the compensating sleeve which are arranged coaxially with respect to one another.

According to a further embodiment, the radial inner side of the through connection tube has an elastic taper so that a frictional connection with the rivet shaft is present. The elastic taper may consist of at least one radially inward protruding web in the through connection tube and/or an O-ring arranged in a radial recess of the through connection tube.

According to the last embodiment mentioned, the through connection tube of the compensating sleeve is tapered by an elastic element in such a way that the rivet shaft inserted into the through connection tube forms a force-fit or frictional connection between the compensating sleeve and the blind rivet. For such an arrangement, a circumferential web protruding radially inwards within the through connection tube or web protruding radially inward and arranged at individual circumferential positions inside the through connection tube may be preferred, for example.

Furthermore, it may be preferred to arrange a radially inward protruding O-ring in the through connection tube in such a way that it constricts the through connection tube with respect to the outer diameter of the rivet shaft so that a rivet shaft inserted in the area of the O-ring is frictionally bound. This frictional connection also ensures that rotation of the blind rivet is transferred to the compensating sleeve in the same way as the positive connection between the compensating sleeve and blind rivet already described above. This ensures that, by turning the blind rivet, selective adjustment of the compensating sleeve is ensured inside the thread connection with the first component A.

According to a further embodiment, the mating thread of the hole in the first component A is formed in the radial inner wall of the hole or the hole of the first component A has a threaded sleeve arranged in a fixed manner in component A, the inner thread of which is designed to fit the outer thread of the compensating sleeve.

According to a further embodiment, the rivet shaft is upset in order to support a frictional connection to the compensating sleeve. Compression of the rivet shaft in its axial direction leads to the rivet shaft being expanded in the radial direction. In this way a frictional connection results with the expanded rivet shaft, which is pressed into the through connection tube of the compensating sleeve. This frictional connection is comparable in properties to the frictional connection between the compensating sleeve and rivet shaft discussed above due to the elastic tapering of the through connection tube.

Moreover, the present disclosure includes a connection method for at least a first component A and a second component B by means of an attachment arrangement with tolerance compensation between the first component A and the second component B. This connection method is distinguished therefore by the following steps: screwing in a compensating sleeve into a mating thread of a hole on the first component A, the outer thread of which is designed to fit the mating thread; insertion of a blind rivet in an insertion direction through a fastening opening on the second component B in an inner through connection tube or passage channel of the compensating sleeve which is in particular unthreaded until a rivet head of the blind rivet rests against the second component B opposite the compensating sleeve; turning the compensating sleeve in the mating thread so that a distance between the first component A and the second component B is spanned; displacing a rivet mandrel of the blind rivet arranged in the through connection tube of the compensating sleeve so that a closing head of the blind rivet is formed adjacent to an end of the compensating sleeve facing away from the supporting end face of the compensating sleeve and the second component B is fixated between the supporting end face and the set head of the blind rivet.

According to a further embodiment of the attachment arrangement, a radial support collar is arranged on the supporting end face of the compensating sleeve. This forms an additional contact area in the axial direction, so that the compensating sleeve can brace itself on the second component B. Accordingly, the second component B is fixated between the support collar and the set head of the blind rivet. Since the compensating sleeve is already held in the opening of the first component A by means of the thread already discussed above, fixation using the blind rivet ensures a secure connection between the components A and B, which both are stabilized on the compensating sleeve.

According to a further embodiment of the connection method, the compensating sleeve is turned manually to span the distance between the first component A and the second component B.

According to a further embodiment of the connection method, the compensating sleeve is turned by means of a tool or by means of the inserted blind rivet via a frictional and/or positive connection in order to ensure simultaneous stabilization of the components A and B on the compensating sleeve.

According to a further embodiment, the connection method has the further step of separating the rivet mandrel from the rivet mandrel head after the closing head has been formed.

The present disclosure furthermore includes an additional attachment arrangement. The attachment arrangement with non-automated tolerance compensation has the following features: a sleeve-like compensating element which has a supporting end face with an entry opening in an interior tube or channel on a first axial end and, adjacent to a second axial end, an outer thread on a radial outer side or an inside or inner thread on a radial inner side; a base element with a bearing face on a first axial base end facing away from the compensating element, which is connected with the second axial end via a frictional and/or positive connection on a second axial base end facing away from the bearing face; the interior tube of the compensating element has a narrowing of its passage adjacent to the entry opening, which forms an axial undercut in the interior tube in the direction of the entry opening.

A further attachment arrangement comprises the combination of a compensating element and a base element. These two elements are attached to one another in an adjustable manner by means of a frictional connection or positive fit, so that they can span over their common length a distance between two components A, B arranged opposite one another. As soon as the distance between the two components A, B is spanned in a supporting manner, the attachment arrangement may be fixated, by means of a blind rivet. This connection between the blind rivet and the attachment arrangement is not nondestructively detachable, as would be the case, for example, with the use of a threaded bolt. For this, the closing head of the blind rivet anchors itself in the interior tube of the compensating element, so that the compensating element and the second component are fixated between the closing head and the set head of the blind rivet.

According to various embodiments of the attachment arrangement, the connection between the compensating element and the base element is a positive or frictional one. A thread connection between the base element and the compensating element is envisaged, for example, for this purpose. Furthermore, a frictional connection may be used.

Since both the compensating element and the base element have bearing faces facing the respective components A, B bordering on them, possible mechanical stresses originating from the components A, B are relieved via these bearing faces and the attachment arrangement. The connection of the compensation element and base element has the advantage that, prior to producing the connection between component A and component B, the length of the attachment arrangement can be set to the distance between the components A, B. A further embodiment envisages for this purpose that the bearing face of the base element be fixated on the first component A. Then, starting from this connection, the adjustment to the distance between the two components A, B may take place by turning the compensating element. Finally, the blind rivet is set in such a way that the closing head of the blind rivet anchors itself in the interior tube of the compensating element.

According to a further embodiment of the attachment arrangement, the narrowing of the passage of the interior tube provides a partial or complete circumferential radial bearing face on which a closing head of a blind rivet can be positively anchored in the direction of the entry opening.

It has proven to be advantageous to anchor the closing head formed in the interior tube of the compensating element behind the aforementioned narrowing of the passage. In fact, it is also conceivable to clamp the closing head firmly in the interior tube without narrowing the passage by means of press fitting, though such a connection would not be able to be fixated reliably particularly in a compensating element made of plastic as well as in compensating elements made of other materials. Therefore the narrowing of the passage as an axial undercut is used, on which the closing head is anchored with a positive fit. This narrowing of the passage may form a radial web protruding inward. According to various embodiments, this is formed completely circumferential or circumferential in sections on the inner side of the interior tube. To use the narrowing of the passage for anchoring, the closing head is formed axially adjacent to the narrowing of the passage. The closing head has a larger outer diameter than the free space which is enclosed in the interior tube by the narrowing of the passage. Accordingly, despite mechanical stress, the closing head cannot pass the narrowing of the passage in an axial direction and fixates in this way the compensating element, thus also the connected base element and the second component between the closing head and the set head of the blind rivet.

According to a further embodiment, the narrowing of the passage has an interior, radial contour which is not rotationally symmetric, in particular a polygonal contour with which a rotation of a blind rivet or a tool is transferable to the compensating element.

While the narrowing of the passage is used as an undercut in the axial direction for the closing head of the blind rivet, it may also be preferred to use this narrowing of the passage as a frictional connection or positive connection for transferring a rotation to the compensating element. In particular, the rivet shaft of the blind rivet or a tool should be inserted through a component opening in the second component into the interior tube for this purpose. In a suitable design of the narrowing of the passage, a positive and/or frictional connection is formed with the rivet shaft or a tool as soon as the rivet shaft or tool passes or extends through the narrowing of the passage.

The compensating element is turned by turning the rivet shaft or tool. Insofar as a threaded connection is present between the base element and compensating element, the length of the attachment arrangement can be set to the spanning distance between the components A, B by this rotation. In order to ensure the transfer of a rotation to the compensating element, the narrowing of the passage may have an interior contour which is not rotationally symmetric. This is, for example, an angular one, so that an angular tool or a rivet shaft which is formed angularly in its outer contour would turn the compensating element with it.

In the same way, it may be preferred that the radial inner side or at least parts of the radial inner side of the narrowing of the passage be elastic in design in order to be able to produce a frictional connection with a rivet shaft or a tool. Such a frictional connection is also able to transfer the rotation of a tool or blind rivet to the compensating element. Accordingly, according to a further embodiment, the narrowing of the passage has an elastic radial inner side with which a frictional connection with a dragging element can be made.

According to a further embodiment of the attachment arrangement, the interior tube passes or extends completely through the compensating element and comprises, adjacent to the second axial end of the compensating element, the inside thread on the radial inner side. An advantageous thread connection can be produced between the compensating element and the base element based on this design of the compensating element. According to a corresponding embodiment of the attachment arrangement, the base element has a threaded bolt with a threaded shaft and a head, and an outer thread of the threaded shaft which forms the second axial base end is formed to fit the inside or inner thread of the interior or inner tube.

Based on the designs described above, the threaded shaft of the base element can be screwed into the inside thread of the interior tube of the compensating element. Since the compensating element may pass or extend completely through the interior tube and the compensating element is thus formed similar to a sleeve, the threaded shaft is able to be accommodated completely in the interior tube corresponding to the required length of the attachment arrangement or can be almost completely screwed out of it. In this way, possible distances between the two components A, B can be set flexibly via the thread connection between the compensating element and the base element.

According to a further embodiment of the attachment arrangement, the base element is T-shaped in design and includes a plate-shaped head which extends radially over the threaded shaft and forms the bearing face facing away from the compensating element.

The T-shaped embodiment of the base element has the advantage that mechanical loads between the base element and the first component A can be relieved over a larger area—in this case the bearing face. Moreover, the bearing face provides a possibility to fixate the base element on the first component. This fixation takes place, for example, by gluing or welding the base element and first component.

According to a further embodiment of the attachment arrangement, the compensating element has a cylindrical shaft with the interior tube on which the outer thread is provided adjacent to the second end of the compensating element on the radial outer side, and in which the interior tube is implemented as a blind hole or as a through connection tube through the cylindrical shaft.

According to a further design alternative of the compensating element, the outer thread is provided on the radial outer side of the compensating element for a thread connection between the compensating element and base element. This outer thread may be connected with the base element in the form of a threaded sleeve with an inside thread. This inside thread is designed to fit the outer thread of the compensating element. There is also the interior tube provided inside the compensating element, which provides the narrowing of the passage for axial anchoring of the closing head of the blind rivet. Due to the thread connection between the outer thread of the compensating element and the inside thread of the base element, the thread connection may extend over a longer range than is the case with the connection described above between the inside thread of the compensating element and the threaded bolt of the base element. These additional relieving surfaces provide the opportunity to relieve greater mechanical loads between the components A, B via the attachment arrangement. Moreover, a continuous interior tube may enable access to the first component as part of an adjustment or positioning process prior to fixation of the attachment arrangement through this interior tube.

According to a further embodiment of the attachment arrangement, the base element is T-shaped in design. Moreover, the T-shaped base element has a plate-shaped support flange which extends in a radial direction on the end side from the threaded sleeve and forms the bearing face facing away from the compensating element. Similar to the T-shaped configuration of the base element described above, made of a threaded bolt with a threaded shaft and head, the T-shaped base element with a threaded sleeve also has a special bearing face for bracing on the first component. This bearing face is formed by the plate-shaped support flange which runs around the threaded sleeve of the base element on the end side in a radially protruding manner. While the support flange can relieve mechanical loads via the attachment arrangement between the components A, B, it also may be used for attachment of the base element to the second component A. For this support flange as well, it may be preferred to fixate the base element via the support flange on the first component, for example by means of gluing, welding or another prevalent attachment method.

According to a further embodiment, the compensating element is T-shaped in design and has a radially extending support collar on the first axial end, which forms a radial bearing face facing away from the base element. In a similar way as was already functionally described above with respect to the support flange used and other bearing faces, the T-shaped compensating element also has a radially extending support collar. This support collar defines an area which functions for load transference between the second component and the attachment arrangement.

According to a further embodiment of the attachment arrangement, said arrangement has an unset blind rivet with a rivet mandrel.

Moreover, the present disclosure includes a connection between at least a first component A and a second component B with an attachment arrangement with non-automated tolerance compensation between the first component A and the second component B according to one of the embodiments described above. This connection is distinguished by the following properties: the base element braces itself with the bearing face on the first axial base end on the first component, a length of the attachment arrangement is adjustable via the frictional and/or positive connection between the base element and the compensating element in such a way that a distance between the first component A and the second component B is spanned by the attachment arrangement and the base element on the first component A and the compensating element in the second component B brace themselves. Moreover, a blind rivet is attached in the interior tube of the compensating element in a manner which is not nondestructively detachable, so that the second component B is fixated between the supporting end face of the compensating element and a set head of the blind rivet.

In a further embodiment of the connection described above, the closing head of the blind rivet in the interior tube of the compensating element adjacent to the narrowing of the passage of the interior tube is arranged in a fixated condition of the two components A, B so that the second component B is fixated between the set head and the closing head of the blind rivet.

Moreover, the present disclosure comprises a connection method for at least a first component A and a second component B by means of an attachment arrangement with non-automated tolerance compensation between the first component A and the second component B according to one of the embodiments described above. The connection method has the following steps: placement of the bearing face of the base element on the first component A, arrangement of the second component B with a component opening aligned with the entry opening of the compensating element, insertion of a tool or a blind rivet through the component opening and the entry opening in the interior tube so that the tool or blind rivet is connected with the compensating element in a positive and/or frictional manner for transferring a rotation to the compensating element, turning the tool or blind rivet and setting a length of the attachment arrangement for spanning a distance between the components A and B and displacing a rivet mandrel of the blind rivet arranged in the interior tube and forming a closing head of the blind rivet adjacent to the narrowing of the passage of the interior tube so that the second component B is fixated between a set head of the blind rivet and the supporting end face of the compensating element.

According to further embodiments of the connection method, further steps are envisaged: attachment of the base element via the bearing face on the first component by one of the following methods or a combination thereof: gluing, screwing, riveting and welding. Moreover, with regard to fixation by means of the blind rivet, it may be preferred to produce a positive connection between the narrowing of the passage and the tool or rivet shaft for turning the compensating element. According to a further embodiment, a positive connection is produced between the narrowing of the passage and the tool or rivet shaft for turning the compensating element. Moreover, the connection method envisages screwing the threaded shaft of the base element into an interior tube passing completely through the compensating element, which has the inside thread on a radial inner side adjacent to a second axial end. Alternatively to this, it may likewise be preferred to screw a threaded sleeve of the base element with an inside thread onto the outer thread of the compensating element, which is arranged adjacent to the second end of the compensating element.

4. BRIEF DESCRIPTION OF THE DRAWINGS

Figure 2:
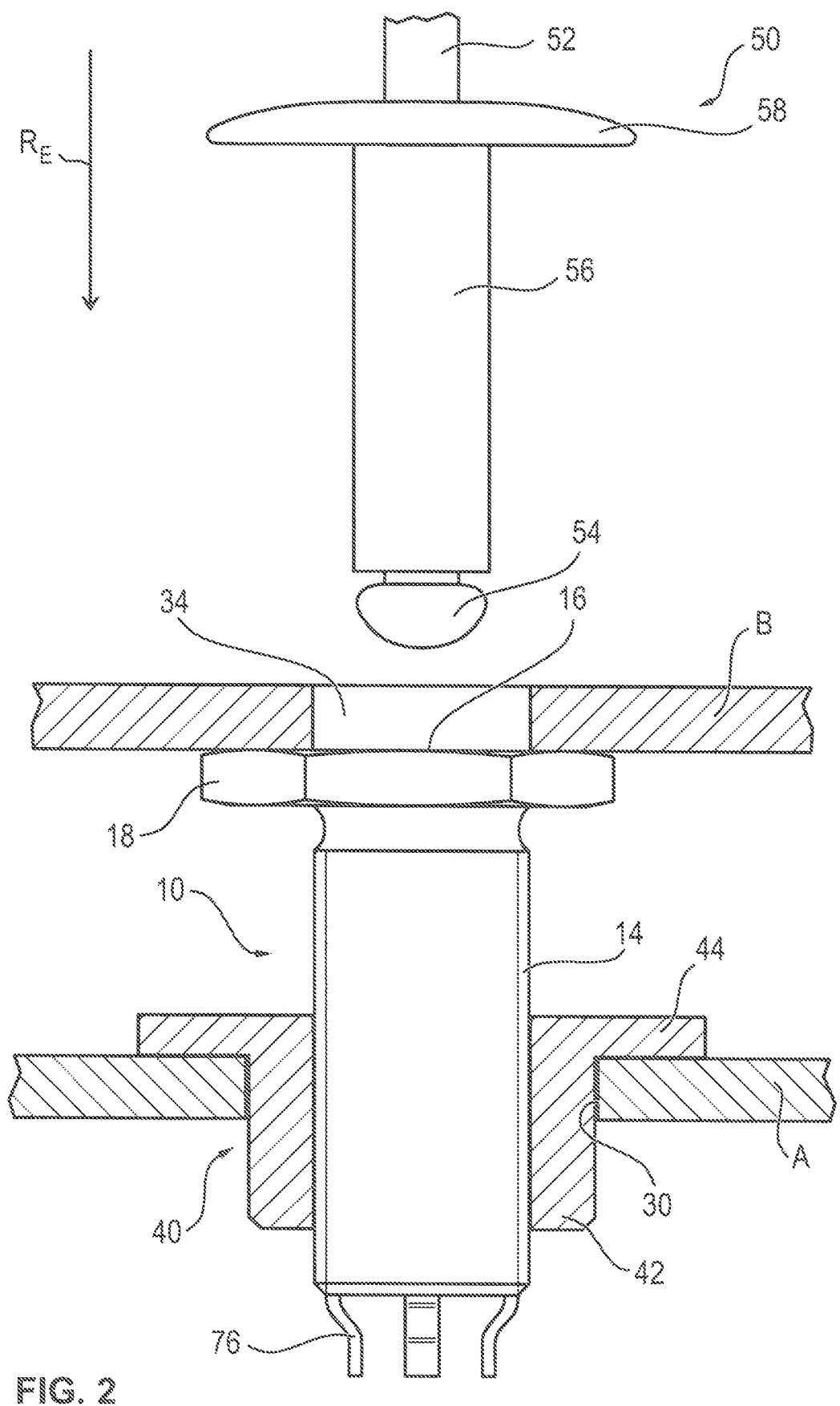
Figure 3:
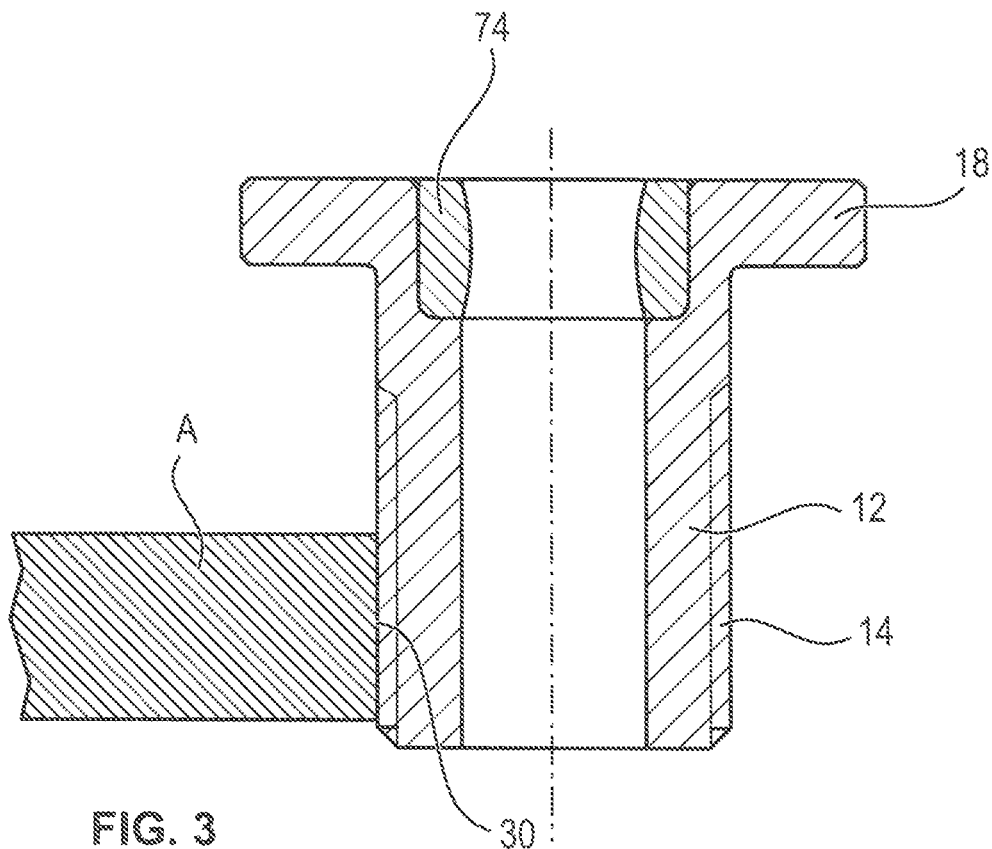
Figure 4:
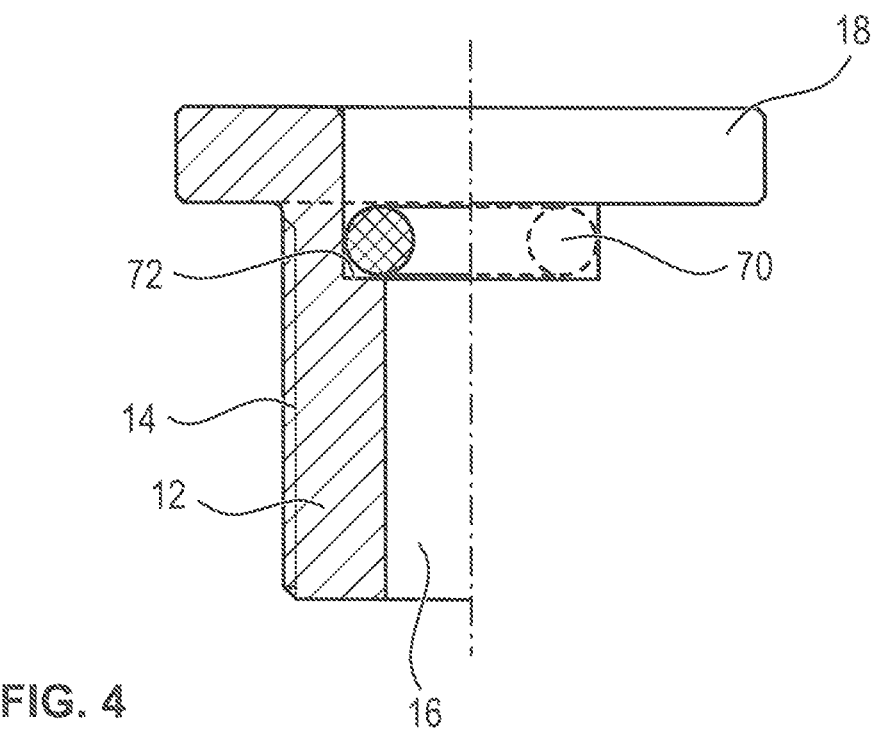
Figure 5:
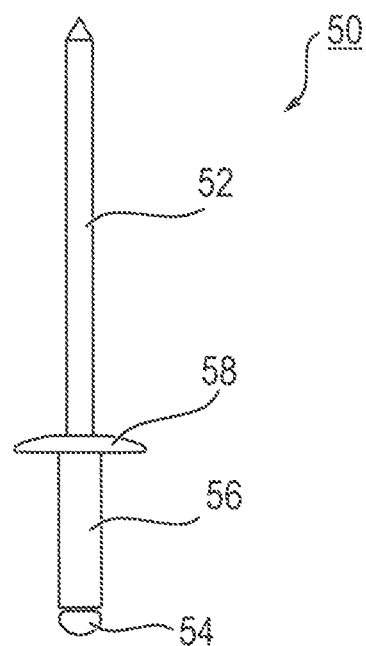
Figure 6:
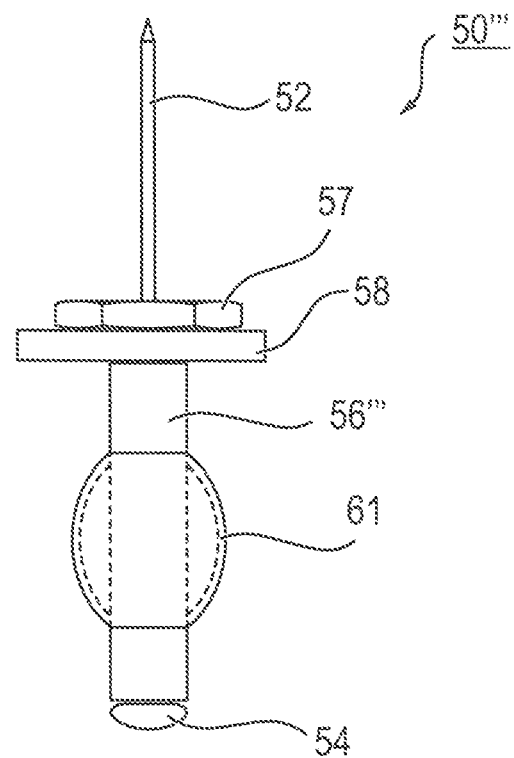
Figure 7:
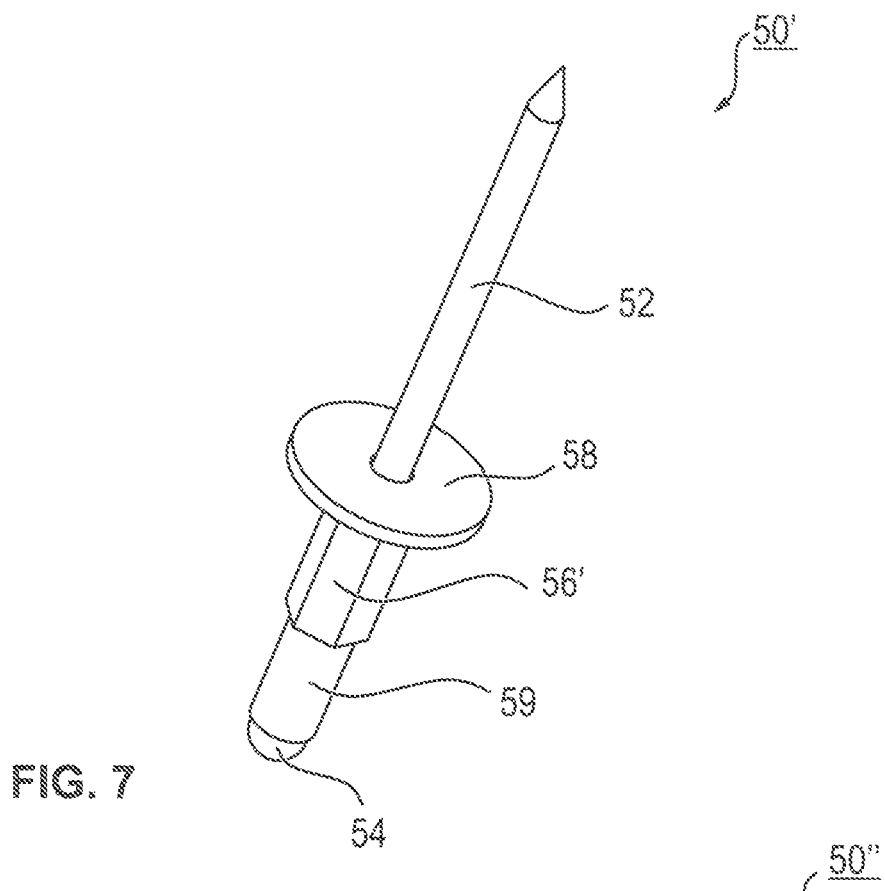
Figure 8:
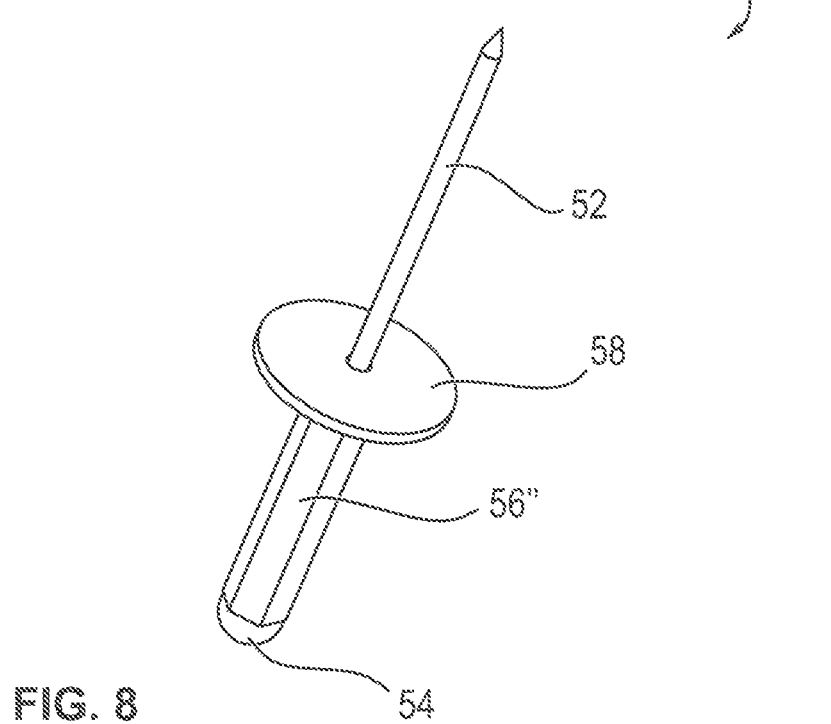
Figure 9:
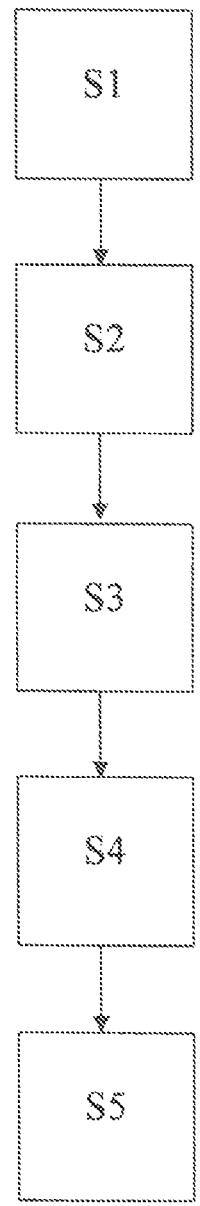
Figure 10:
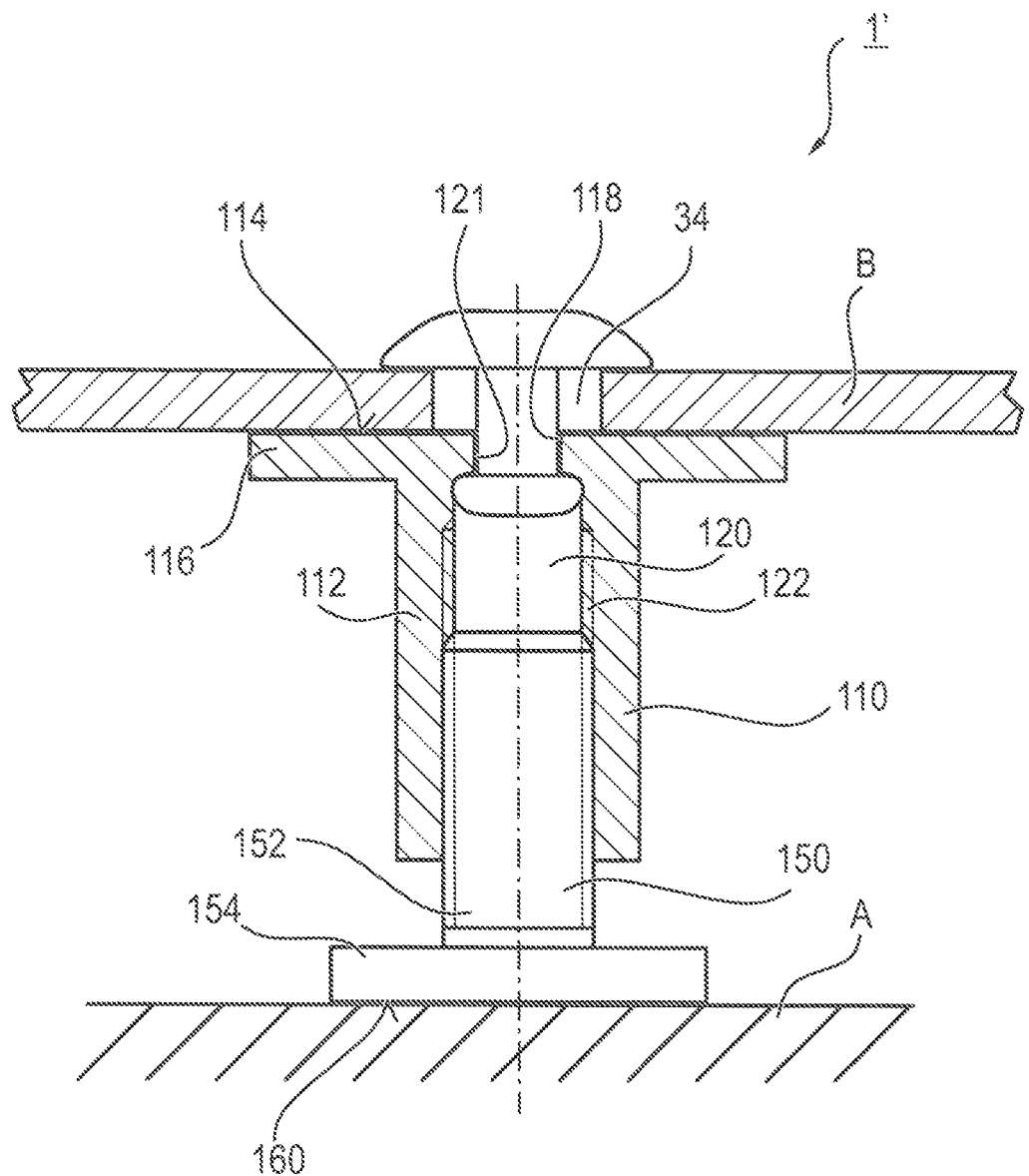
Figure 11:
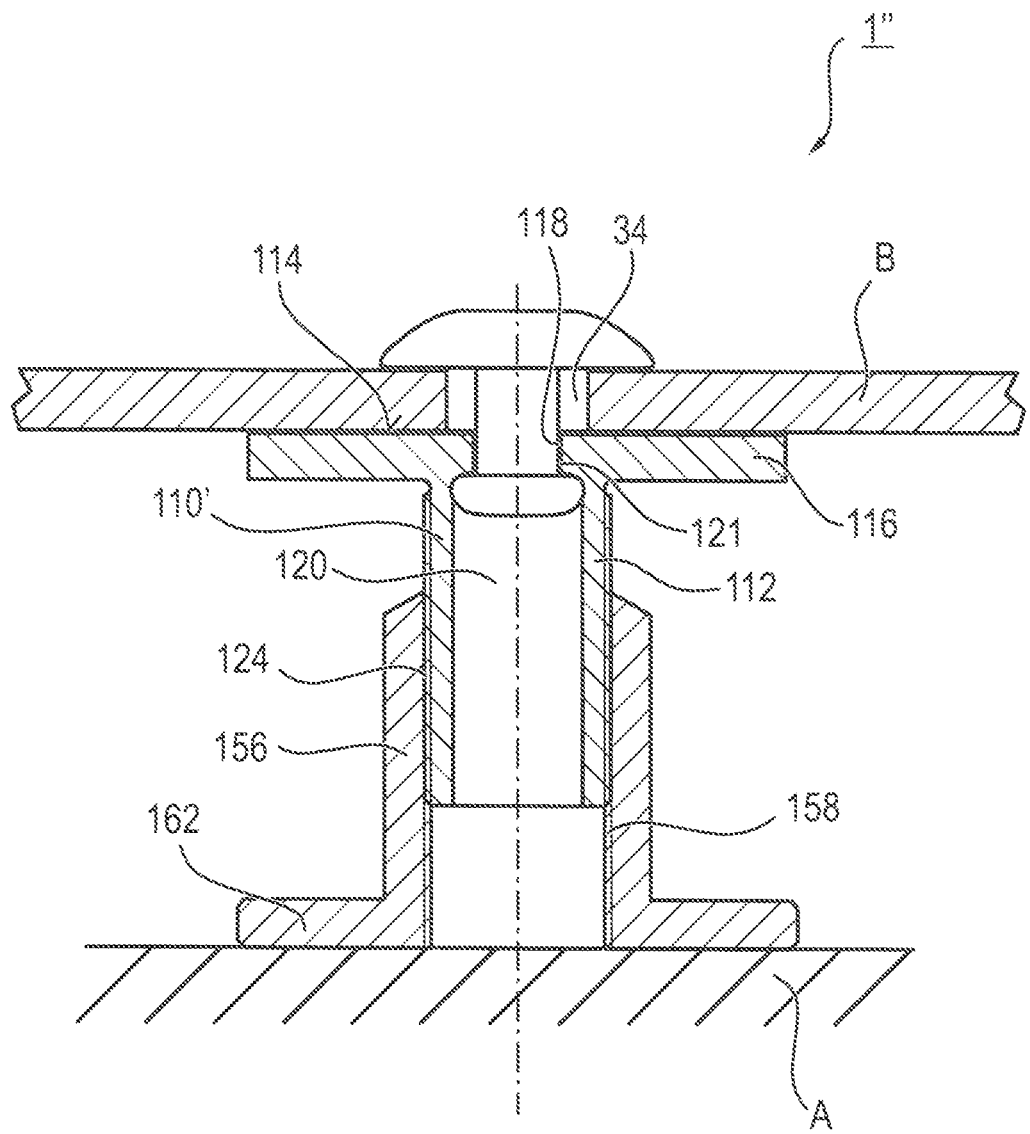
Figure 12:
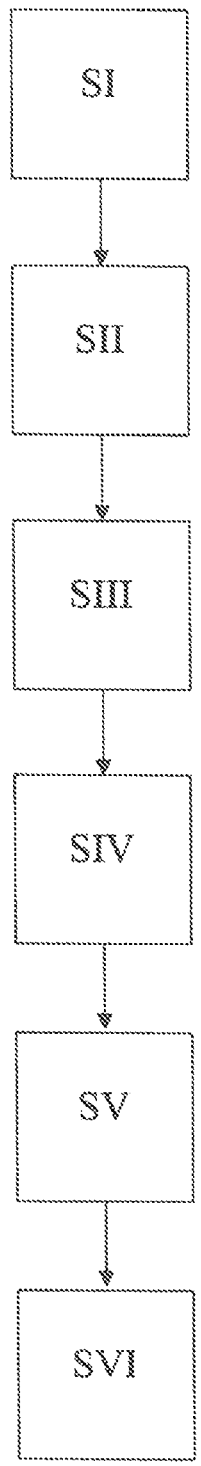

The embodiments of the present disclosure are explained in greater detail with reference to the accompanying drawings. Showing:

FIG. 1 an embodiment of the connection between a first component and a second component having an attachment arrangement with tolerance compensation arranged between them, FIG. 2 an embodiment of the connection between the first component and the second component with the attachment arrangement before the blind rivet for fixating the two components via the attachment arrangement has been placed and fixated, FIG. 3 an embodiment of the compensating sleeve, FIG. 4 a further embodiment of the compensating sleeve, FIG. 5 an embodiment of the blind rivet, FIG. 6 a further embodiment of the blind rivet, FIG. 7 a further embodiment of the blind rivet, FIG. 8 a further embodiment of the blind rivet, FIG. 9 a flow diagram of the embodiment of the connection method, FIG. 10 an embodiment of the attachment arrangement consisting of a sleeve-like compensating element in combination with a base element in the form of a threaded bolt with a head, FIG. 11 a further embodiment of the attachment arrangement consisting of a sleeve-like compensating element in combination with a sleeve-like base element, which is screwed onto an outer thread of the compensating element, and FIG. 12 a flow diagram of an embodiment of the connection method for the attachment arrangement according to FIGS. 10 and 11.

5. DETAILED DESCRIPTION

FIG. 1 shows a first component A and a second component B, which are securely connected to one another with an attachment arrangement with tolerance compensation between the components A, B. "Tolerance compensation" is understood to be the supportive spanning of a distance T between the two components A, B arranged opposite one another. During the production of the connection between the components A and B, the compensation of tolerance does not occur automatically. Instead, a bridging of the distance T between the components A, B is set selectively by means of a compensating sleeve 10 and afterward the connection is fixated.

The compensating sleeve 10 comprises a sleeve-like area 12 with an outer thread 14 and a through connection tube 16. A connection may be produced with the first component A via the outer thread 14. For this purpose, the outer thread 14 engages in a thread 32 which is provided in an opening 30 of the first component A.

According to a further embodiment, the opening 30 in the first component A comprises a radial inner wall with an inner thread fitting the outer thread 14. According to a further embodiment, a threaded sleeve 40 is situated in the opening 30. It may comprise a threaded shaft 42 on the radial inner side of which the thread 32 is provided. Moreover, the threaded sleeve 40 has a radial collar 44 in order to brace itself on the first component A. According to various design options, the threaded sleeve 40 is screwed into the opening 30 or pressed into it or glued into it or attached with a combination of the methods of attachment named.

Therefore, in order to produce a connection between the components A, B, the compensating sleeve 10 is screwed into the opening 30 with an inner thread or into the threaded sleeve 40 arranged in the opening 30 (Step S1 of the connection method). Then, the second component B may be arranged adjacent to the first component A. The compensating sleeve 10 is turned by means of the thread connection 14, 32 until the compensating sleeve 10 spans the distance T between the components A, B. Accordingly, the compensating sleeve 10 braces itself on the first component A via the thread connection 14, 32. An end of the compensating sleeve 10 facing toward component B braces itself on the second component B.

The end of the compensating sleeve 10 facing toward component B may be constituted by a support collar 18. The radial support collar 18 may rest on a side of the component B facing toward the compensating sleeve 10.

According to another embodiment, the compensating sleeve 10 is envisaged without a support collar. In this case, the sleeve-like area 12 is designed in a sufficiently stable manner so that it provides a supporting end face adjacent to the second component B. This end face then rests on component B in the same manner as the support collar 18 described above.

In order to compensate the distance T between the components A, B, the spacing sleeve 10 is screwed via its outer thread 14 into the thread 32 or out of it (Step S3).

According to various procedures, the compensating sleeve 10 is turned in the opening 30 of the first component A manually or with the aid of a tool and thus displaced axially.

According to a further embodiment, a blind rivet 50 is inserted first through a fastening opening 34 in component B in an insertion direction RE into the through connection tube 16 (Step S2). The blind rivet 50 may form a positive and/or frictional connection to the compensating sleeve 10. This connection enables turning the compensating sleeve 10 by turning the blind rivet 50, so that in this way too the axial position of the compensating sleeve 10 can be set with the reference to the first component A.

The blind rivet 50, 50', 50", 50''' is shown in various embodiments in FIGS. 2 and 5-8. In all embodiments, it is comprised of a rivet mandrel 52 with a rivet mandrel head 54 and a rivet shaft 56 with a set head 58. In the set condition of the blind rivet 50, the rivet mandrel head 54 and an end of the rivet shaft 56 facing away from the set head 58 together form a closing head 60 (see FIG. 1, Step S4).

As already mentioned above, according to various embodiments the distance T between the components A, B is compensated or spanned by turning the blind rivet 50 in the compensating sleeve 10 (Step S3). For this purpose the through connection tube 16 may have a radial taper such that the compensating sleeve 10 forms a frictional connection with the rivet shaft 56 in the through connection tube 16. According to a further embodiment, the radial taper in the through connection tube 16 consists of an O-ring 70 which is arranged in a circumferential groove 72 (see FIG. 4). It may furthermore be preferable that the O-ring 70 is arranged adjacent to the support collar 18. It may also be preferred to position the O-ring 70 in another axial position in the through connection tube 16 as long as a frictional connection to the rivet shaft 56 can be produced at this axial position.

FIG. 3 shows an alternative embodiment for a radial taper of the through connection tube 16. In FIG. 3, the compensating sleeve 10 is screwed directly into the opening 30 of component A via the outer thread 14. The through connection tube 16 has a radially inward protruding bead 74 which can also be implemented as a circumferential web, a lip or a plurality of radial webs.

FIG. 2 shows a further embodiment of a dragging element 76. This is constituted by a plurality of axial webs. These axial webs are arranged at the end of the compensating sleeve 10, which is adjacent to the component B. Moreover, the axial webs are formed to be inclined or curved radially inward, so that they define a diameter which is formed smaller than the diameter of the through connection tube 16. Correspondingly, the rivet shaft 56 arranged between the axial webs and/or the rivet mandrel head 54 is held frictionally, so that the compensating sleeve 10 follows a turn of the blind rivet 50.

According to a further embodiment, which is shown in FIG. 6, the set head 58 has a drive means or propulsion agent 57. This propulsion agent 57 can be combined with all embodiments of the blind rivet 50. It is used for engagement of a tool with which the blind rivet 50 and, via the blind rivet 50, the compensating sleeve 10 are then turned and thus adjusted axially.

In this context, it may also be preferred to design a radial outer edge of the set head 58 as a propulsion agent. A propulsion agent may be a square or hexagon or another non-rotationally symmetric shape which is suited for the engagement of a tool.

According to a further embodiment, the rivet shaft 56—in FIG. 6 has a radial widening or expansion 61. This is envisaged as being radially springy or elastic inward. If one inserts the radially expanded or widened rivet shaft 56''' into the through connection tube 16, the frictional connection to the compensating sleeve 10 is formed by the radial expansion 61. This frictional connection is able to be used only through the expansion 61 or through the expansion 61 in combination with the tapering of the through connection tube 16 discussed above.

The expansion 61 may be formed by an upsetting or compressing of the rivet shaft or by spring arms.

It may further be preferred that the turning together of the blind rivet 50 and compensating sleeve 10 take place via a positive connection between the through connection tube 16 and the rivet shaft 56', 56". The rivet shaft 56" may be formed with a polygonal cross-section, hexagonal, over its entire length or in a section 56'. Correspondingly, the through connection tube 16 has a polygonal cross-section formed in a complementary manner to it. If the rivet shaft 56'; 56" is inserted into the through connection tube 16, the geometries of the radial inner wall of the through connection tube 16 and the radial outer wall of the rivet shaft 56'; 56", which are adapted to one another in a non-rotationally symmetric manner, form a positive connection security against rotation.

According to the embodiment in FIG. 7, a section 59 of the rivet shaft is formed in a hollow cylindrical manner, in order to support reshaping into the closing head 60 by the rivet mandrel head 54.

As soon as the compensating sleeve 10 has been set to fit and the distance between the components A, B is spanned, the rivet mandrel head 54 is axially displaced via the rivet mandrel 52. The closing head 60 is formed by this, and the components A, B are fixated to one another in a manner which is not nondestructively detachable (Step S4). In this connection, the component B is held between the set head 58 and the support collar 18 or in a supporting end face of the compensating sleeve 10. The component A is attached to the outer sleeve 10 via the thread connection.

Finally, the rivet mandrel 52 is separated from the rivet mandrel head 54 in a known manner (Step S5).

A further attachment arrangement 1', 1" is shown in FIGS. 10 and 11. The two components A, B are attached to one another by means of the attachment arrangement 1', 1". In this connection, the attachment arrangement 1', 1" spans the distance between the two components A, B. While a base element 150 is braced here on the first component A, a compensating element 110 is attached in the fastening opening 34 of the second component B in a manner which is not nondestructively detachable using a blind rivet 50. Since the base element 150 and the compensating element 110 are connected to one another in a frictional and/or positive manner, a distance between the components A, B can be spanned supportively by the combination of the compensating element 110 and the base element 150. Moreover, the frictional and/or positive connection between the compensating element 110 and the fastening element 150 enables the length of the attachment arrangement 1', 1" to be set to the distance between the two components A, B, as is explained below in more detail. This setting of the length of the attachment arrangement 1', 1" takes place in a non-automated manner during connection of the components A, B.

The compensating element 110; 110' is constructed in a manner similar to a sleeve, as can be seen based on the FIGS. 10 and 11. It comprises a cylindrical shaft 112 with a supporting end face 114 in the direction of the second component B. In an embodiment, the supporting end face corresponds only to the end face of the cylindrical shaft 112 (not shown) which faces toward the second component B. In the embodiment in FIGS. 10 and 11, the supporting end face 114 may be enlarged by a support collar 116 extending radially from the cylindrical shaft 112. Within the connection between the two components A, B, this braces itself on the second component B and relieves mechanical loads by doing so.

The cylindrical shaft 112 has an entry opening 118 in the end face 114 on its axial end facing toward the second component B. The entry opening 118 leads to an inner channel or interior tube 120 which may be arranged concentrically with respect to the longitudinal axis of the cylindrical shaft 112.

According to a first embodiment of the interior tube 120, this is formed as a through connection tube as can be seen in FIG. 10. This embodiment has the advantage that the compensating element 110'; 110" can be formed as a threaded sleeve with an inner or inside thread 122 (see FIG. 10) and/or an outer thread 124 (see FIG. 11). A threaded bolt may be used as a base element 150 in combination with the inside thread 122. Here a threaded shaft 152 of the base element 150 is screwed into the inside thread 122 of the compensating element 110 while a head 154 of the threaded bolt is able to be braced on the first component A in a connection between two components A, B.

Of course, it may also be preferred to provide the interior tube 120—a through connection tube in FIG. 10—as two separate blind holes which extend from the oppositely arranged axial ends of the cylindrical shaft 112 (not shown). Since the two blind holes are not connected with one another, the interior tube 120 is not continuous. This avoids the passing of fluids or dirt through the interior tube 120, which supports the connection between the components A, B.

According to another embodiment, the cylindrical shaft 112 of the compensating element 110' is equipped with an outer thread 124 (see FIG. 11). The outer thread 124 may be used in combination with the base element 150, which has a threaded sleeve 156 with an inner or inside thread 158 (see FIG. 11).

According to a further embodiment of the threaded sleeve 156, this is equipped with an outer thread. The outer thread, like the threaded shaft 152, enables screwing in the threaded sleeve 156 into the interior tube 120 adjacent to the axial end of the cylindrical shaft 112 facing toward the base element 150. The threaded sleeve 156 has the advantage in general, and precisely with regard to the inside thread 158 used, that a larger thread diameter, for example compared to the threaded bolt 152, 154, ensures larger threaded surfaces for taking up and relieving mechanical stresses between the components A, B. It is also advantageous with reference to the space available between the components A, B to use the space-saving threaded bolt 152, 154 in place of the threaded sleeve 156.

The head 154 of the base element 150 has a bearing face 160 on its side facing toward the first component A. This rests on the first component A in a connection. The threaded sleeve 156 may comprise a plate-shaped support flange 162, which provides a bearing face on the first component A. Correspondingly, the base element 150 may be formed in a T-shape in the various embodiments. The same applies to the selected embodiments of the compensating element 110; 110'.

The interior tube 120 may have a narrowing of the passage 121 adjacent to the entry opening 118. The narrowing of the passage 121 reduces the diameter of the interior tube 120 so that an undercut is formed in an axial direction of the interior tube 120. In this context, the interior tube 120 may be provided as a through connection tube or blind hole.

The narrowing of the passage 121 also may be a web or lip protruding radially inward into the interior tube 120. This radial web extends circumferentially or in sections from the radial inner wall of the interior tube 120. Correspondingly, the circumferential web or the individual sections arranged at regular intervals in the circumferential direction of the inner side of the interior tube form a bearing face which runs radially or approximately radially. This bearing face of the narrowing of the passage 121 constitutes an undercut in the axial direction of the interior tube 120.

A blind rivet 50 is used to fasten the attachment arrangement 1'; 1" on the second component B with a component opening 34 as in the previously described embodiments. The blind rivet 50 is set in such a way that the closing head 60 forms adjacent to the narrowing of the passage 121 in the interior tube 120. Since the closing head 60 has an outer diameter which is larger than the free inner diameter of the narrowing of the passage 121, the closing head 60 is held on the narrowing of the passage 121 secured against pulling out. Correspondingly, the narrowing of the passage 121 forms an undercut in the axial direction for the closing head 60 of the blind rivet 50.

The closing head 60 of the blind rivet 50 may be fastened on the narrowing of the passage 121 in a positive manner in the interior tube 120. In addition to this, it may also be preferred that the closing head 60 be clamped in the interior tube 120 due to its radial expansion. This may lead to an additional friction-fit or frictional connection between the blind rivet 50 and the compensating element 110; 110'.

In order to attach the two components A, B to one another via the attachment arrangement 1'; 1", first the base element 150 with the bearing face 160 or the support flange 162 is placed on the first component A (SI). The fastening element 150 may be attached to the component A via the bearing face 160. According to various embodiments, the attachment takes place in step SII by gluing, welding, friction welding, riveting, screwing or by other known fastening options.

Since the components A, B to be connected to one another are arranged at a particular distance or with a certain tolerance with respect to one another, this distance must be spanned by the length of the attachment arrangement 1'; 1". The distance is then spanned if the support flange 162 of the base element 150 are braced on the first component A and the support collar 116 of the compensating element 110; 110' is braced on the component B. According to the embodiments of the attachment arrangement 1'; 1" described above, the compensating element 110; 110' and the base element 150 are coupled to one another via an adjustable thread connection, To set the length of the attachment arrangement 1'; 1", the compensating element 110; 110' is turned by means of a tool (not shown) or the rivet shaft 56 (Step SIV), which is inserted through the entry opening 118 into the interior tube 120 (Step SIII).

If the tool or the rivet shaft 56 is inserted into the interior tube 120, it passes the narrowing of the passage 121. The narrowing of the passage 121 may have a radial inner contour which is not rotationally symmetric in order to form a positive connection to the tool or rivet shaft. A contour which is not rotationally symmetric may be polygonal, oval, elliptical or similar in shape.

When a tool has the outer contour fitting to it, it also may be preferred to equip the rivet shaft 56 at least in sections with such a contour. This was already described with reference to the FIGS. 7 and 8.

According to a further embodiment, the narrowing of the passage 121 has an elastic area on a radial inner side. This elastic area may be ensured by a deformable profiling, an elastic coating and/or a radially deformable dimensioning of the narrowing of the passage 121. Correspondingly, a frictional connection between the tool/rivet shaft 56 and compensating element 110; 110' is formed with a tool (not shown) inserted into the interior tube 120 or a rivet shaft 56. The frictional connection enables transference of a rotation by the tool or rivet shaft 56 to the compensating element 110; 110' in the same manner as the positive connection described above.

As soon as the length of the attachment arrangement 1'; 1" is set to the distance between the components A, B, the entry opening 118 is aligned with the opening 34 in the component B. For this the component B is arranged to fit with respect to the component or the attachment arrangement 1'; 1" is positioned to fit between the already arranged components A, B.

In this context, it also may be preferred that the second component B is first arranged adjacent to the compensating element 110; 110' in order to subsequently set or adjust the length of the attachment arrangement 1'; 1". The component opening 34 and entry opening 118 may be aligned with one another for this. After that the tool (not shown) or the rivet shaft 56 is inserted through the two openings 34, 118 in the narrowing of the passage 121 in order to set the length of the attachment arrangement 1'; 1" to fit by means of turning.

If the rivet shaft 56 with a rivet mandrel 52 and rivet mandrel head 54 is not yet inserted into the interior tube 120 after length adjustment has taken place, the rivet shaft 56 is now inserted into the interior tube 120 through the component opening 34 and the narrowing of the passage 121 (Step SV). The length of the rivet shaft 56 is adapted in such a way that the rivet shaft 56 and the rivet mandrel head 54 extend past the narrowing of the passage 121 in the direction of the base element 150 in order to form a closing head 60.

Finally, the rivet mandrel 52 is displaced in an axial direction away from the base element in a known manner (Step SVI) and the closing head 60 is formed.

Correspondingly, a positive and frictional connection may result between the component B, the blind rivet 50 and the compensating element 110; 110'. This is because the set head 58 braces itself on the component B, and the component B and the compensating element 110; 110' are clamped between the set head 58 and closing head 60 via the narrowing of the passage 121.

This connection can only be detached or released if the blind rivet 50 is destroyed.

The invention claimed is:

1. A connection between at least a first component A and a second component B with an attachment arrangement with tolerance compensation between the first component A and the second component B, in which the attachment arrangement has the following features:
   a. a compensating sleeve which comprises an interior through connection tube and, on a radial outer side, an outer thread, wherein
   b. the outer thread is formed to fit a mating thread of a hole of the first component A, in which the compensating sleeve is arranged in an axially adjustable manner for tolerance compensation between the first component A and the second component B by turning,
   c. the compensating sleeve has on an end side, facing away from the first component A, a supporting end face against which the second component B rests, wherein
   d. a blind rivet which is not nondestructively detachable is attached in the interior through connection tube so that the second component B is fixated between the supporting end face and a set head of the blind rivet.

2. The connection according to claim 1 in which the blind rivet has a sleeve-like rivet shaft with the set head which can be accommodated in the interior through connection tube.

3. The connection according to claim 2, which comprises a rivet mandrel in the sleeve-like rivet shaft which has a rivet mandrel head on an end of the sleeve-like rivet shaft facing away from the set head.

4. The connection according to claim 3, wherein the supporting end face is a radial support collar and in which a length of the sleeve-like rivet shaft is adapted to a length of the compensating sleeve such that in a fixated condition of the two components A, B a closing head of the blind rivet is arranged adjacent to an end of the compensating sleeve facing away from the radial support collar.

5. The connection according to claim 2, in which a radial outer side of the sleeve-like rivet shaft is adapted to a radial inner side of the interior through connection tube of the compensating sleeve such that they form a frictional and/or positive connection.

6. The connection according to claim 5, in which the sleeve-like rivet shaft has a polygonal outer profile which engages positively in a polygonal inner profile of the interior through connection tube.

7. The connection according to claim 5, in which the radial inner side of the interior through connection tube has an elastic taper so that a frictional connection with the sleeve-like rivet shaft is present.

8. The connection according to claim 7, in which the elastic taper consists of at least one radially inward protruding web in the interior through connection tube and/or an O-ring arranged in a radial recess of the interior through connection tube.

9. The connection according to claim 1, in which a sleeve-like rivet shaft is upset in order to support a frictional connection to the compensating sleeve.

10. The connection according to claim 1, in which the compensating sleeve has, at an end side adjacent to the first component A, a dragging element with which a frictional connection can be produced with a sleeve-like rivet shaft.

11. The connection according to claim 1, in which the mating thread of the hole in the first component A is formed in a radial inner wall of the hole or the hole of the first component A has a threaded sleeve arranged in a fixed manner in the first component A, an inner thread of which is configured to fit the outer thread of the compensating sleeve.

12. Attachment arrangement, with the following features:
 a compensating element being a sleeve, which
  has, on a first axial end, a supporting end face with an entry opening into an interior tube and
  has, adjacent to a second axial end, an outer thread on a radial outer side or an inside thread on a radial inner side;
 a base element with a bearing face on a first axial base end facing away from the compensating element, which is connected with the second axial end of the compensating element via a frictional and/or positive connection on a second axial base end facing away from the bearing face, wherein
 the interior tube of the compensating element has a narrowing of a passage of the interior tube adjacent to the entry opening, which forms an axial undercut in the interior tube in a direction of the entry opening, and which comprises an unset blind rivet with a rivet mandrel.

13. The attachment arrangement according to claim 12, in which the narrowing of the passage of the interior tube provides a partial or complete circumferential radial bearing face on which a closing head of a blind rivet can be positively anchored in the direction of the entry opening.

14. The attachment arrangement according to claim 12, in which the narrowing of the passage has an inner contour which is not rotationally symmetric with which a rotation of a blind rivet or a tool is transferable to the compensating element.

15. The attachment arrangement according to claim 12, in which the narrowing of the passage has an elastic radial inner side with which a frictional connection with a dragging element can be made.

16. The attachment arrangement according to claim 12 in which the interior tube passes completely through the compensating element and includes the inside thread on the radial inner side adjacent to the second axial end.

17. The attachment arrangement according to claim 16, in which the base element has a threaded bolt with a threaded shaft and a head, and an outer thread of the threaded shaft which forms the second axial base end is formed to fit the inside thread of the interior tube.

18. The attachment arrangement according to claim 17, in which the base element is T-shaped and includes a plate-shaped head which extends radially beyond the threaded shaft and forms the bearing face facing away from the compensating element.

19. The attachment arrangement according to claim 12, in which the compensating element has a cylindrical shaft with the interior tube on which the outer thread is provided adjacent to the second axial end of the compensating element on the radial outer side, and in which the interior tube is realized as a blind hole or as an interior through connection tube through the cylindrical shaft.

20. The attachment arrangement according to claim 19, in which the base element includes a threaded sleeve with an inside thread which is configured to fit the outer thread of the compensating element.

21. The attachment arrangement according to claim 20, in which the base element is T-shaped and has a plate-shaped support flange which extends radially on an end side from the threaded sleeve and forms the bearing face facing away from the compensating element.

22. The attachment arrangement according to claim 12, in which the compensating element is T-shaped and has a radially extending support collar on the first axial end, which forms a bearing face facing away from the base element.

23. A connection between at least a first component A and a second component B with the attachment arrangement with tolerance compensation between the first component A and the second component B according to claim 12, in which
 the base element is braced with the bearing face on the first axial base end on the first component A,
 a length of the attachment arrangement is adjustable via the frictional and/or positive connection between the base element and the compensating element in such a way that a distance between the first component A and the second component B is spanned by the attachment arrangement and the base element on the first component A and the compensating element on the second component B brace themselves, and
 in the interior tube a blind rivet which is not nondestructively detachable is attached so that the second component B is fixated between the supporting end face of the compensating element and a set head of the blind rivet.

24. The Connection according to claim 23, in which a closing head of the blind rivet in the interior tube adjacent to the narrowing of the passage of the interior tube is arranged in a fixated condition of the two components A, B so that the second component B is fixated between the set head and the closing head of the blind rivet.

* * * * *